W. HARDICK.
TURNBUCKLE.
APPLICATION FILED NOV. 25, 1908.

925,901.

Patented June 22, 1909.

WITNESSES:
H.H. Yarrington.
Mary S. Tooker

INVENTOR.
William Hardick
BY
Edward Taggart ATTORNEY.

NORRIS PETERS, INC., LITHO., WASHINGTON D.C.

UNITED STATES PATENT OFFICE.

WILLIAM HARDICK, OF CADILLAC, MICHIGAN.

TURNBUCKLE.

No. 925,901.  Specification of Letters Patent.  Patented June 22, 1909.

Application filed November 25, 1908. Serial No. 464,502.

*To all whom it may concern:*

Be it known that I, WILLIAM HARDICK, a citizen of the United States, residing at Cadillac, in the county of Wexford and State of Michigan, have invented new and useful Improvements in Turnbuckles, of which the following is a specification.

My invention relates to improvements in turn buckles designed especially for use in situations where the uniting parts are exposed to injury by the elements or accidental breaking and injury from blows; and I have found it particularly adapted to use in connection with bridles holding in their proper relative position the parallel rails of any car track; but it may also be employed for a great variety of analogous uses.

The object of the invention I accomplish by the construction shown in the accompanying drawings, in which—

Figure 1:
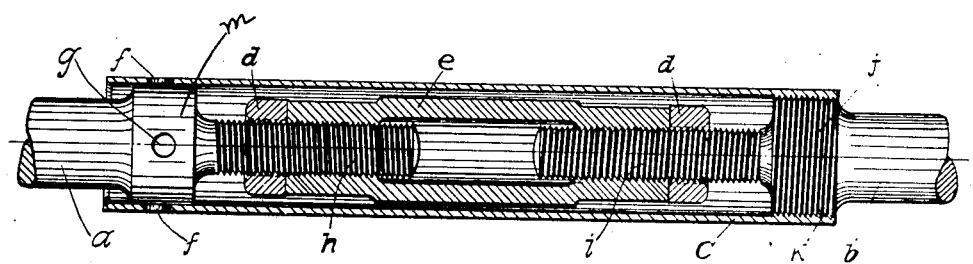
Figure 3:
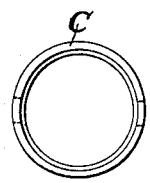
Figure 2:
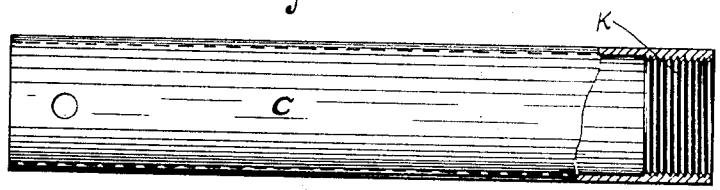
Figure 5:
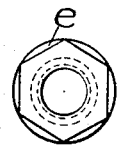
Figure 4:

Figure 1 is a vertical, longitudinal cross-section of the sleeve and adjacent parts which constitute the device. Fig. 2 is a side view of the same sleeve having a portion broken away to show the vertical cross-section. Fig. 3 is an end view of the same sleeve. Fig. 4 is a side view of the right and left hand nut embodied in the device. Fig. 5 is an end view of the same nut.

In the drawing $a$ and $b$ are the two rods, or other structures, which are to be connected longitudinally by adjustable connection. The adjacent ends of these rods are threaded by respectively right and left hand threads as indicated by the portions $h$ and $i$. $e$ is an elongated right and left hand nut for engaging respectively these threaded ends $h$ and $i$. This nut may be in any suitable or customary form and should be so constructed that it may be grasped and turned with a wrench. I accomplish this result by making the end portions hexagonal in form, as especially shown by Fig. 5.

$d\ d$ are lock nuts in the usual form, which are threaded upon the respective portions $h$ and $i$ and which may be turned to or from the nut $e$ so as to lock it in any desired position.

C is a sleeve covering and protecting the operating parts of the device. At one end this sleeve is provided with an interior thread as indicated by $k$, and this engages with a corresponding exterior thread in any suitable position upon one of the connected parts, as indicated by $j$. In order to make the sleeve of size sufficient to cover the working parts, it may be necessary to provide the rod $b$ with an enlarged portion, upon which the exterior thread is cut, as particularly illustrated in Fig. 1. In other forms of the device this enlargement might not be necessary. At or near the other end of the sleeve and in connection with the adjacent end of the other rod or part to be connected, I provide means for engaging these parts against revolution. As such means I have shown a series of holes $ff$ in the sleeve, and a corresponding hole $g$ in the rod $a$. Through these holes pins or screws may be removably inserted for locking the two parts together. In the form shown in Fig. 1 there should be an enlargement of the rod $a$ at $m$, as indicated, so that it will make a close working fit with the interior of the sleeve $c$.

The operation of my device is apparent from the description already given. If it is desired to use the same in connection with a bridle between the rails of a track, the parts of this bridle are indicated by $a$ and $b$. The ends are brought near together and the nut $e$ attached and screwed up until the proper adjustment is attained. Then the lock nuts $d\ d$ are turned into position, thus retaining the adjustment. During this operation the sleeve has been at one side, surrounding one or the other of the rods, and it is now brought up so as to cover and inclose the parts already described, and, by means of the threaded engagement $j\ k$, is fastened to the rod $b$. This threaded engagement can be so adjusted longitudinally that the holes $f$ and $g$ at the other end of the sleeve will be in alinement, and the pin, or other suitable fastening means can be inserted. In this way the operating parts of the device are securely protected against accidental injury or against damage by the elements, and when the device is used in connection with a bridle between the car rails, are especially protected against ice and snow and against injuries caused by objects passing over or along the track. At the same time a further or secondary lock is provided reinforcing the operation of the lock nuts. The sleeve also forms another means of connection between the rods and stiffens and reinforces the connection formed by the ordinary turn buckle.

Having thus described my invention, what I claim to have invented, and desire to secure by Letters Patent, is—

1. In a turn buckle the combination with the two members to be connected, each having a threaded end portion and a nut connecting said members, of an integral sleeve surrounding said nut and attached to one of said members for adjustment axially thereof, said sleeve being constructed for detachable connection at a fixed point to the other member.

2. In a turn buckle the combination with the two members to be connected, each having a threaded end portion and a nut connecting said members, of a sleeve surrounding the nut, means connecting the sleeve with one of the members for adjustment axially thereof, and locking means for the sleeve connecting the same to the other member, said locking means when engaged, holding the sleeve against adjustable movement.

3. In a turn buckle the combination with the two members to be connected, each having a threaded end portion and a nut connecting the members, of an integral sleeve surrounding the nut and having threaded engagement at one end thereof with one of the members, said sleeve having an aperture at its other end and the other member having an aperture which registers with the aperture in the sleeve.

In testimony whereof I have hereunto set my hand in presence of two subscribing witnesses.

WILLIAM HARDICK.

Witnesses:
 FRED. S. LAMB,
 J. H. WHEELER.